US009307191B2

(12) United States Patent
Berrett et al.

(10) Patent No.: US 9,307,191 B2
(45) Date of Patent: Apr. 5, 2016

(54) VIDEO TRANSMISSION

(71) Applicant: Microsoft Technology Licensing, LLC, Redmond, WA (US)

(72) Inventors: Douglas D. Berrett, Seattle, WA (US); Lucian Dragne, London (GB); Sean E. Kollenkark, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/084,090

(22) Filed: Nov. 19, 2013

(65) Prior Publication Data

US 2015/0138308 A1    May 21, 2015

(51) Int. Cl.
| | |
|---|---|
| *H04N 7/14* | (2006.01) |
| *H04N 7/15* | (2006.01) |
| *H04L 29/06* | (2006.01) |
| *G06K 9/00* | (2006.01) |
| *H04N 21/4223* | (2011.01) |
| *H04N 21/4788* | (2011.01) |

(52) U.S. Cl.
CPC .......... *H04N 7/141* (2013.01); *G06K 9/00369* (2013.01); *H04L 65/1083* (2013.01); *H04L 65/601* (2013.01); *H04N 7/15* (2013.01); *H04N 21/4223* (2013.01); *H04N 21/4788* (2013.01)

(58) Field of Classification Search
CPC .......... H04N 7/15; H04N 7/152; H04N 7/14; H04N 21/26216; H04N 2007/145
USPC ........................................ 348/14.01–14.16
See application file for complete search history.

(56) References Cited

U.S. PATENT DOCUMENTS

| 8,384,791 | B2 | 2/2013 | Porter et al. |
| 8,832,193 | B1* | 9/2014 | Lindberg et al. .............. 709/204 |
| 2000/0038414 | | 6/2000 | Cohen-Solal et al. |
| 2003/0090564 | A1 | 5/2003 | Strubbe |
| 2005/0094646 | A1* | 5/2005 | Lee .................. H04L 29/06027 370/395.52 |
| 2006/0215016 | A1* | 9/2006 | Cohen et al. ............... 348/14.12 |
| 2008/0151786 | A1 | 6/2008 | Li et al. |

(Continued)

FOREIGN PATENT DOCUMENTS

| WO | WO-9957900 | 11/1999 |
| WO | WO-2012068008 | 5/2012 |

OTHER PUBLICATIONS

Lining, et al.,' "FocalSpace: Multimodal Activity Tracking, Synthetic Blur and Adaptive Presentation for Video Conferencing", In SUI '13 Proceedings of the 1st symposium on Spatial user interaction, MIT Media Lab,Jul. 20, 2013, 4 Pages.

(Continued)

*Primary Examiner* — Melur Ramakrishnaiah
(74) *Attorney, Agent, or Firm* — Danielle Johnston-Holmes; Micky Minhas

(57) ABSTRACT

Disclosed is a method of transmitting video via a network and a user device and computer program product configured to implement the method. The method comprises transmitting video of one or more users, received from an image capture device, to at least another user device via the network; receiving information about a communication channel between the user device and the other user device and/or about one or more resources of the user device and/or the other user device; selecting characteristics from a plurality of visual user characteristics based on the received information; and controlling the video based on detection of the selected characteristics to track the selected characteristics.

28 Claims, 9 Drawing Sheets

(56) References Cited

U.S. PATENT DOCUMENTS

| | | | |
|---|---|---|---|
| 2008/0250458 A1* | 10/2008 | Roman | 725/61 |
| 2009/0079840 A1 | 3/2009 | Gandhi et al. | |
| 2011/0141222 A1 | 6/2011 | Hoelsaeter | |
| 2012/0092445 A1 | 4/2012 | McDowell et al. | |
| 2012/0158972 A1 | 6/2012 | Gammill et al. | |
| 2012/0169923 A1 | 7/2012 | Millar et al. | |
| 2012/0195363 A1 | 8/2012 | Laganiere et al. | |
| 2012/0203796 A1 | 8/2012 | Abraham et al. | |
| 2012/0327176 A1 | 12/2012 | Kee | |
| 2012/0327179 A1* | 12/2012 | Watson et al. | 348/14.08 |
| 2013/0100228 A1* | 4/2013 | Tapia et al. | 348/14.01 |
| 2013/0178282 A1 | 7/2013 | Davis et al. | |
| 2013/0271559 A1 | 10/2013 | Feng et al. | |
| 2014/0198838 A1* | 7/2014 | Andrysco | H04N 19/167 375/240.1 |

OTHER PUBLICATIONS

"International Search Report and Written Opinion", Application No. PCT/US2014/065885, Apr. 21, 2015, 16 pages.

"Kinect", Retrieved from the Internet: http://en.wikipedia.org/wiki/Kinect on Dec. 1, 2011, 2011, 18 pages.

BenAbdelkader,"Single Camera Multiplexing for Multi-Target Tracking", International Conference on Image Analysis and Processing, 1999, 13 pages.

Cheng,"Body-Tracking Camera Control for Demonstration Videos", CHI 2013 Extended Abstracts, 2013, 6 pages.

Nakamura,"Real-time 3-D Object Tracking Using Kinect Sensor", Proceedings of the 2011 IEEE Conference on Robotics and Biometrics, Dec. 2011, 13 pages.

"Second Written Opinion Issued in PCT Application No. PCT/US2014/065855", Mailed Date: Dec. 17, 2015, 7 pages.

* cited by examiner

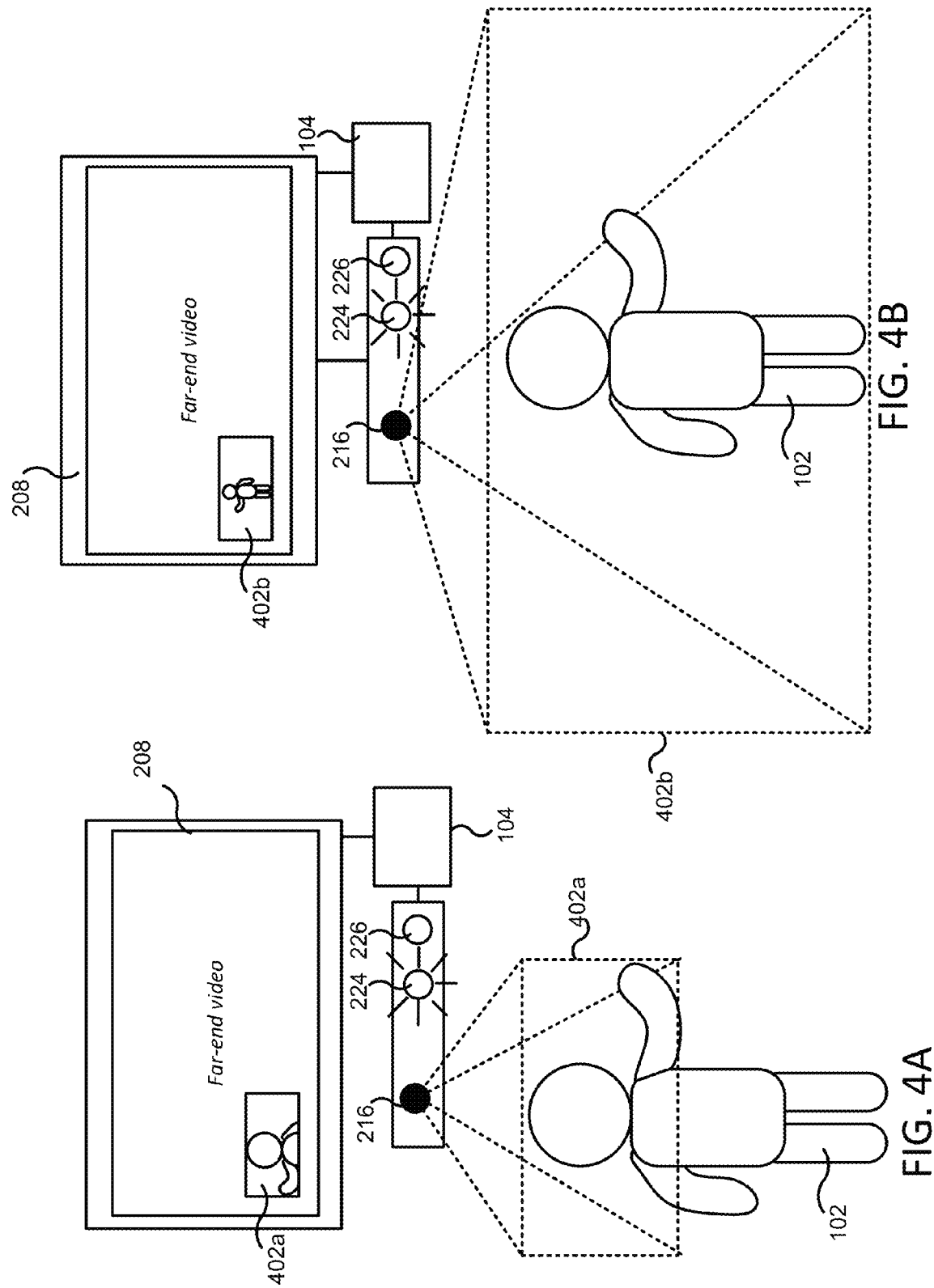

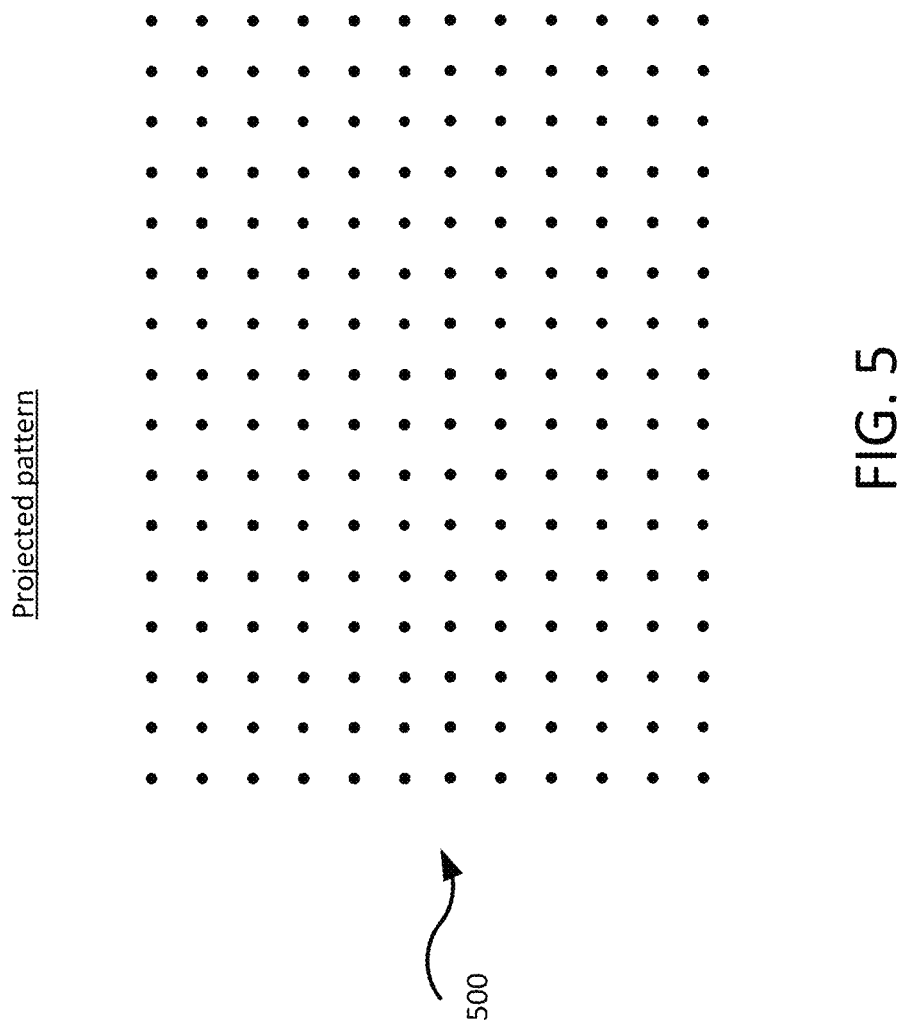

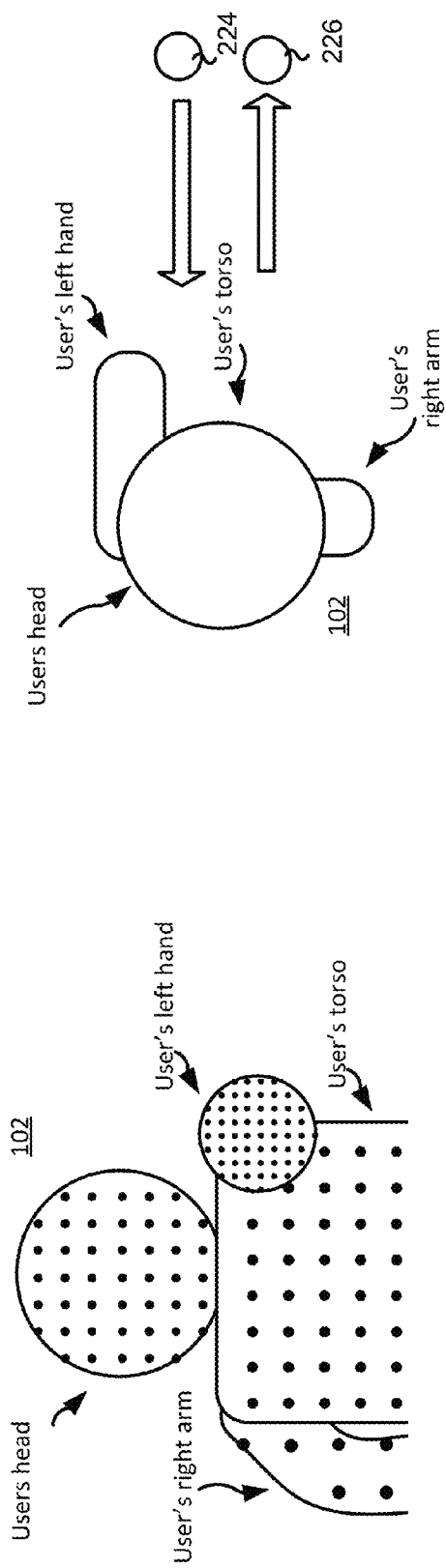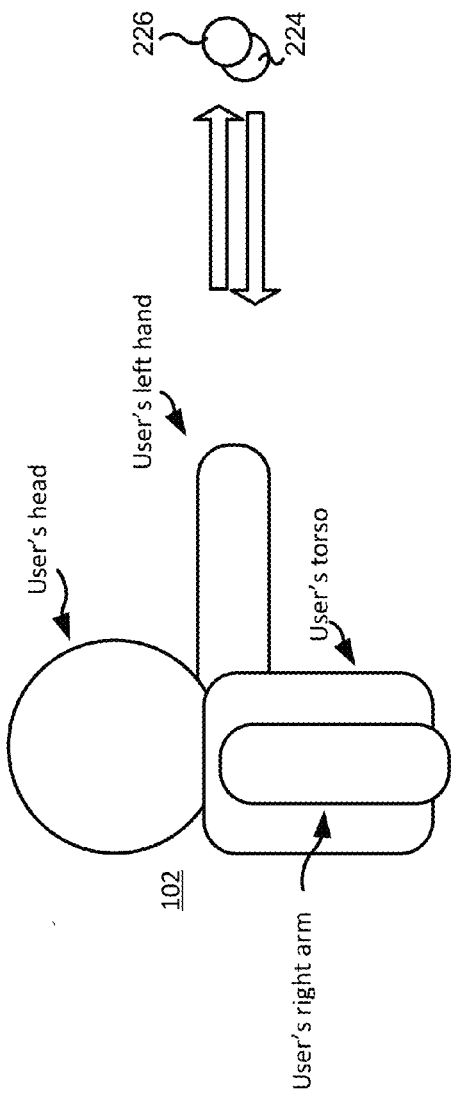

VIDEO TRANSMISSION

BACKGROUND

Conventional communication systems allow the user of a device, such as a personal computer or mobile device to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and user authentication. In addition to voice communication, the client may also set up connections for other communication media such as instant messaging ("IM"), SMS messaging, file transfer and voicemail.

Recently, internet capabilities and functionality has been integrated into user devices such as games consoles arranged to be connected to a television set of other (e.g. large-screen) display means, television sets themselves (often referred to as a "Smart TV"), set-top boxes arranged to be connected to a television set etc. . . . This includes the integration of client software into a games console, television set, set-top box (or similar) to enable communications over a packet-based computer network such as the Internet. This integration of client software allows a large, high-resolution screen to be utilised for video calling by outputting video signals to a near-end user received from a far-end user. Furthermore, significant processing power can be provided in user devices such as set-top boxes, TVs etc. particularly as the power requirements for a large, mains electricity powered consumer electronics device are less stringent than, for example mobile devices. This can enable a full range of features to be included in the embedded communication client, such as high quality voice and video encoding of video data received from a camera connected to the user device or from other similar image input means.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is disclosed a user device comprising a network interface, a video controller and a resource manager. The network interface is configured to transmit video of one or more users, received from an image capture device, to at least another user device via a network. The video controller is configured to select of one or more characteristics from a plurality of visual user characteristics and control the video based on detection of the selected characteristics to track the selected characteristics. The resource manager is configured to receive information about a communication channel between the user device and the other user device and/or about one or more resources of the user device and/or the other user device and, based on the received information, to control said selection by the video controller.

Also disclosed is a user device comprising a network interface for connecting to a network and one or more processors. The one or more processors are configured to transmit video of one or more users, received from an image capture device, to another user device via the network. The one or more processors are further configured to select characteristics from a plurality of visual user characteristics and to generate first and second sets of boundary data based on detection of the selected characteristics at first and second times respectively. The one or more processors are further configured to generate transition data based on the first and second sets of boundary data using a dynamic model and to control the video based on the transition data to track the selected characteristics.

Also disclosed are corresponding methods, and respective computer program products comprising executable code configured to each of those methods.

BRIEF DESCRIPTION OF FIGURES

For an understanding of the present subject matter and to show how the same may be carried into effect, reference will be made by way of example to the following drawings in which:

FIGS. 4A and 4B are schematic illustrations of a user interacting with a user device;

FIG. 5 is a schematic illustration of a radiation pattern;

FIGS. 6A, 6B and 6C are schematic front, plan and side views of a user respectively;

DETAILED DESCRIPTION

Disclosed herein is a technique whereby, during a video call (1-to-1 or multiparty), a user's location in a room is detected using depth detection means (a depth detector or similar) and video of the call as transmitted to other user(s) is controlled to track the user based on that detection. More specifically, respective visual characteristics of that user (such as body parts of that user) are so detected, and the video is controlled to track selected ones, but not necessarily all, of those characteristics (e.g. body parts). Whether or not a particular visual characteristic is tracked depends on communication channel conditions (e.g. channel bandwidth) and/or near-end and/or far-end device resources—for example, (e.g.) fewer characteristics (e.g. body parts) may be tracked for lower channel bandwidth and/or smaller screen size of the far-end device and more characteristics (e.g. body parts) may be tracked for higher channel bandwidth and/or larger screen size of the far-end device.

Figure 1:
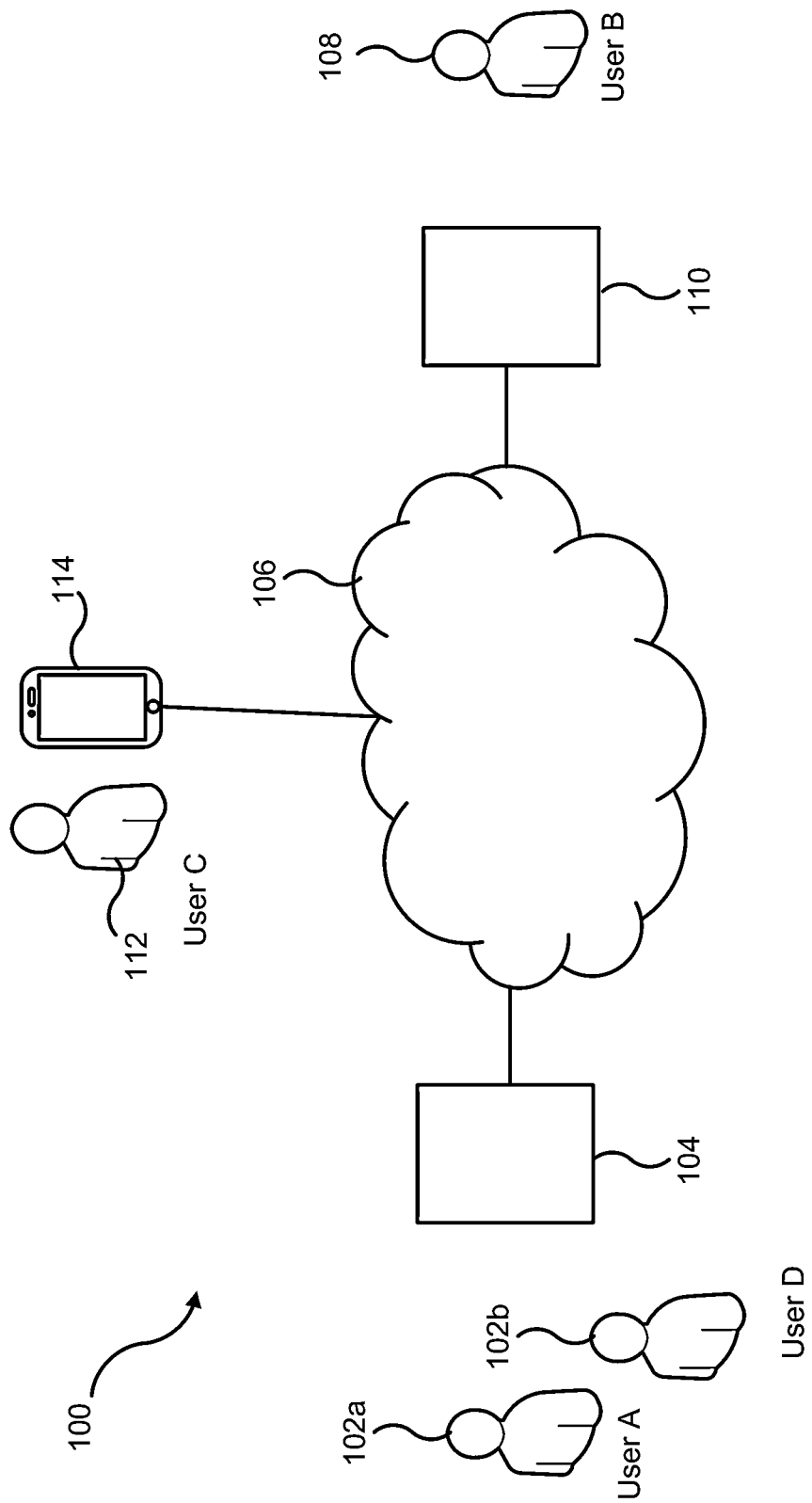
FIG. 1 is a schematic illustration of a communication system.

FIG. 1 shows a communication system 100 comprising a first user 102*a* ("User A") who is associated with a first user device 104, a second user 108 ("User B") who is associated with a second user device 110, a third user 112 ("User C") who is associated with a third user device 114, and a fourth user 102*b* ("User D") in the vicinity of the first user. In other embodiments the communication system 100 may comprise any number of users and associated user devices. The user devices 104, 110 and 114 can communicate over the network 106 in the communication system 100, thereby allowing the users 102a, 102b, 108 and 112 to communicate with each other over the network 106. The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a games console or other gaming device, a television, a personal digital assistant ("PDA") or other embedded device able to connect to the network 106. The user device 104 is arranged to receive information from and output information to the uses 102a, 102b. The user device 104 comprises output means such as a display and speakers. The user device 104 also comprises input means such as a keypad, a touch-screen, a microphone for receiving audio signals and/or a camera for capturing images of a video signal comprised of a sequence of video frames (images). The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the users 102a and 102b to communicate over the network 106. The user device 114 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the users 102a, 102b to communicate over the network 106. The user devices 104, 110 and 114 are endpoints in the communication system 100. FIG. 1 shows only four users (102a, 102b, 108 and 112) and three user devices (104 and 110) for clarity, but many more users and user devices may be included in the communication system 100, and may communicate over the communication system 100 using respective communication clients executed on the respective user devices.

Figure 2:
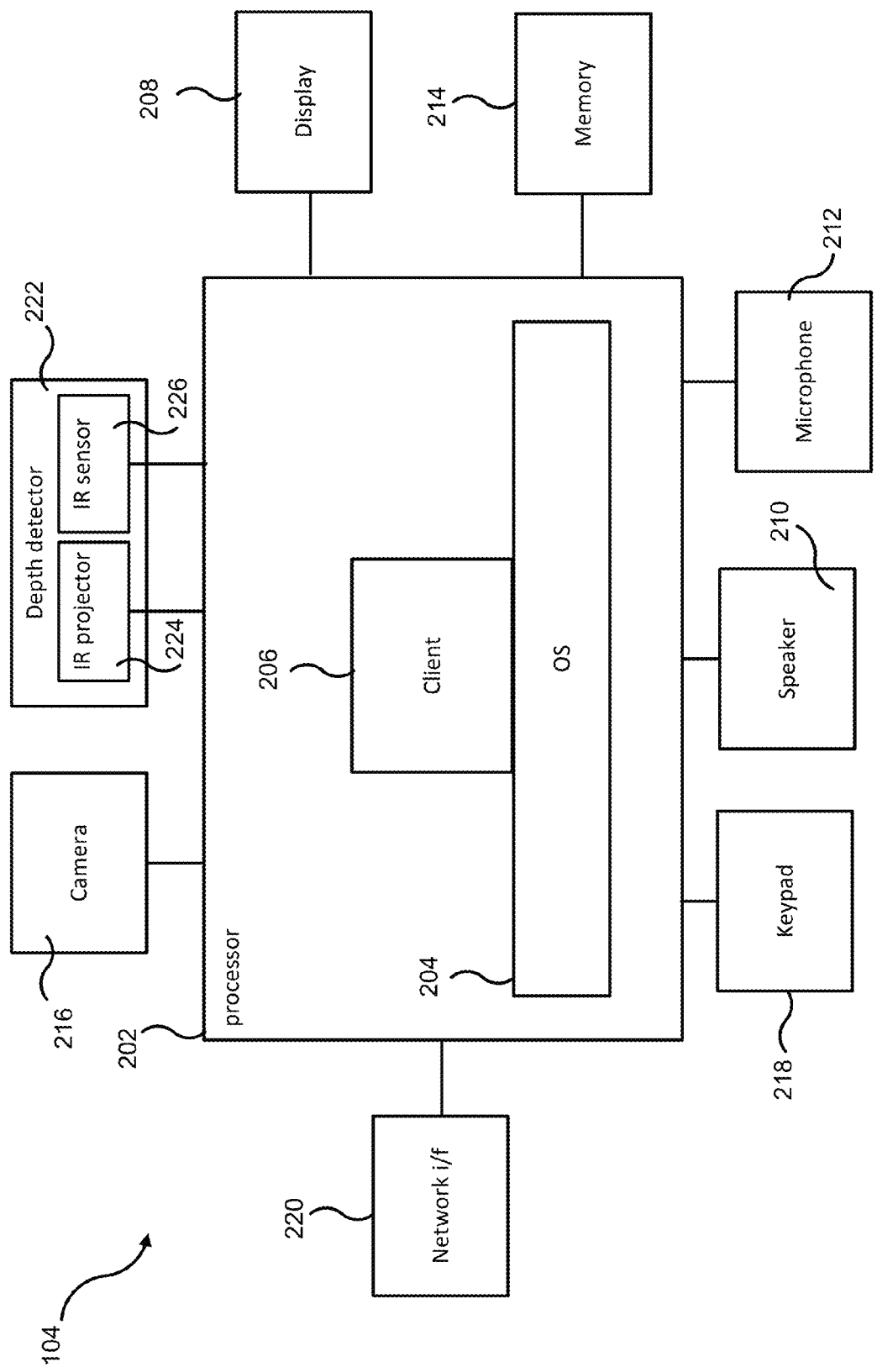
FIG. 2 is a schematic block diagram of a user device.

FIG. 2 illustrates a detailed view of the user device 104 on which is executed a communication client instance 206 for communicating over the communication system 100. The user device 104 comprises processor or "processing module" 202, the processor comprising one or more central processing units ("CPUs"), to which is connected: output devices such as a display 208 which may be implemented as a touch-screen, a speaker (or "loudspeaker") 210 for outputting audio signals, and a radiation projector 224 for outputting non-visible radiation such as an infra-red (IR) projector; input devices such as a microphone 212 for receiving audio signals, a camera 216 for receiving image data, a keypad 218, and a radiation sensor array 226 for receiving non-visible images of a non-visible radiation signal e.g. an IR camera for receiving images of an infra-red signal; a memory 214 for storing data; and a network interface 220 such as a modem for communication with the network 106. The speaker 210 is connected to the processor 202 via an audio signal processing module 209. The user device 104 may comprise other elements than those shown in FIG. 2. The display 208, speaker 210, microphone 212, memory 214, camera 216, keypad 218 and network interface 220 may be integrated into the user device 104. Alternatively, one or more of the display 208, speaker 210, microphone 212, memory 214, camera 216, keypad 218 and network interface 220 may not be integrated into the user device 104 and may be connected to the processor 202 via respective interfaces. One example of such an interface is a USB interface. For example, for user devices in the form of games consoles, the camera 216, projector 224, sensor 226, display 208, microphone 212, keypad 218 (e.g. a game controller) may not be integrated into the games console and may be connected to the processor 202 via respective interfaces, whilst the network interface 220, memory 214 and processor 202 may be integrated into the games console. If the connection of the user device 104 to the network 106 via the network interface 220 is a wireless connection then the network interface 220 may include an antenna for wirelessly transmitting signals to the network 106 and wirelessly receiving signals from the network 106.

The projector 224 and sensor 226 constitute a depth detector 222 for capturing non-visible radiation data in three dimensions ("3D"). In this embodiment, the projector 224 projects a radiation pattern, forward of the sensor 226, which is detectable by the sensor 226; sensor data from the sensor 226 is used to build up the 3D image based on distortions in the detected radiation pattern (as explained in more detail below with reference to FIGS. 5 and 6A-6C). The depth detector 222 and camera 216 may be housed together in a single unit external to the user device 104, possibly having a power supply separate to the user device 104, connected to the processor 202 via a suitable interface (e.g. USB or USB-based). An example of such a unit is the Microsoft Kinect Sensor™.

FIG. 2 also illustrates an operating system ("OS") 204 executed on the processor 202. Running on top of the OS 204 is the software of the client instance 206 of the communication system 100. The operating system 204 manages the hardware resources of the user device 104 and handles data being transmitted to and from the network 106 via the network interface 220. The client 206 communicates with the operating system 204 and manages the connections over the communication system. The client 206 has a client user interface which is used to present information to the user 102 and to receive information from the user 102. In this way, the client 206 performs the processing required to allow the user 102 to communicate over the communication system 100.

Figure 3:
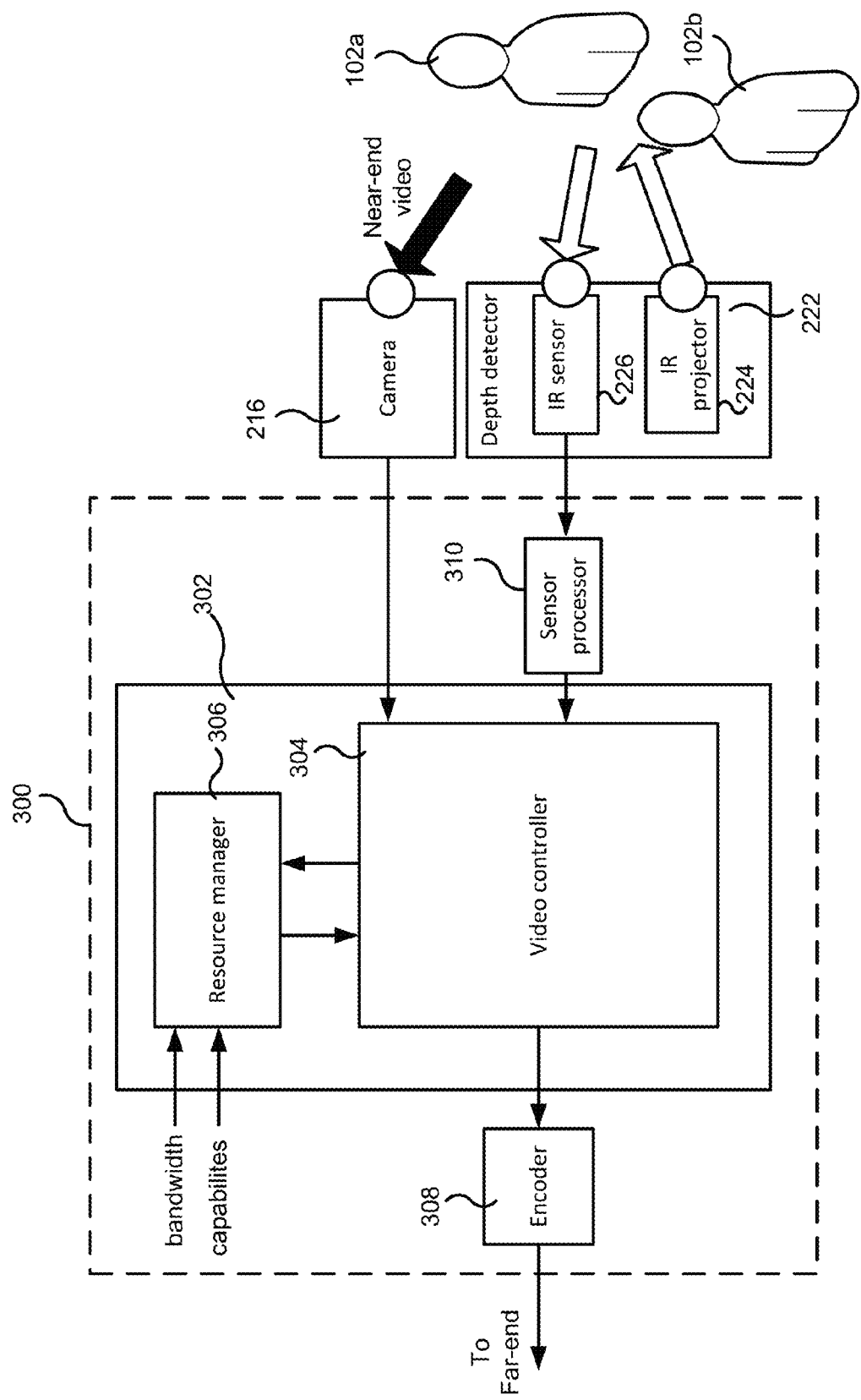
FIG. 3 is a function diagram of a video control technique.

With reference to FIG. 3, there will now be described a method of transmitting video over a network. FIG. 3 is a functional diagram of part of the user device 104.

As shown in FIG. 3, the user device 104 comprises an encoder 308 (e.g. an H264 encoder). This may be a hardware encoder to which video data is supplied by the processor 202 for encoding prior to transmission over the network 106, a software encoder implemented by software executed on (e.g.) processor 202, or a combination of both. The user device further comprises controller 302 (implemented e.g. as part of the software of the client 106), the camera 216, the depth detector 222 and a depth processor 310. The controller 302 comprises a resource manager 306 and a video signal processor 304. The camera 216 captures images of a video of users 102a, 102b (labelled "near-end video" in FIG. 3) in a visible spectrum (that is, visible to a human eye) and supplies those captured images to a first input of the video signal processor. The sensor 226 captures images in a non-visible spectrum (that is, not visible to a human eye) and supplies those captured images to an input of the depth processor 310. The depth processor 310 has an output coupled to a second input of the video signal processor. The projector 224 projects non-visible radiation forward of the sensor 226 towards users 102a, 102b which is detectable by the sensor 226. The controller 300, encoder 308 and sensor processor 310 constitute a video processing system 300.

The resource manager 306 has first, second and third inputs and an output. The first of resource manager 306 input is configured to receive information about one or more communication channels between the user device 104 and one or more other user devices (e.g. 108, 112) of the network 106. The second input of the resource manager 306 is configured to receive information about resources of the user device 104 and/or one or more other user devices (e.g. 110, 114). The third input of the resource manager is coupled to an output the video signal processor 304.

The output of the resource manager 302 is coupled to a third input of the video signal processor 304. The video signal processor 304 has an output coupled to an input of the encoder 308. The encoder is configured to supply encoded video data which may be subject to further processing at the device 104 (e.g. packetization) before being supplied to the network interface 220 for transmission over the network 106 to at least one of the second user device 110 and the third user device 114.

The sensor processor 310 is operable to process sensor data captured by, and received from, the sensor 226 to detect a respective plurality of visual user characteristics for each user in a field of view of the sensor 226.

The video signal processor 302 is configured to select characteristics from a plurality of visual user characteristics based information output from the resource manager 306 and to control video supplied to the encoder 308 for encoding based on detection of the selected characteristics by the sensor processor 310, with the video being so controlled to track the selected characteristics i.e. such that the video tracks the selected characteristics over time, eventually making the detected characteristics visible in the video.

This will now be described with reference to FIGS. 4A and 4B. FIGS. 4A and 4B show a user 102 (e.g. 102a, 102b) in the vicinity of the user device 104 (which is a shown as a games console in this embodiment). The user device is coupled to the display 208, the camera 216, the projector 224 and the sensor 226 all of which are external to the user device 104 in this embodiment. In FIG. 4A, video of a first visible region 402a—limited to include upper portions (e.g. head, shoulders etc.) of the user 102 but not lower portions (e.g. feet, legs etc.) of the user 102—as captured by camera 216 is supplied to the encoder 308 for encoding and ultimately transmission to another user (e.g. 112, 108) over the network 106. As shown in FIG. 4, a version of the video of region 408a is transmitted to the other user is optionally displayed on display 208 as well, overlaid on video received from that other user. In FIG. 4B, video of a second visible region 402b—which includes both the upper portions of the user 102 and the lower portions of the user 102—as captured by camera 216 is supplied to the encoder 308 for encoding and ultimately transmission the other user over the network 106. As shown in FIG. 4, a version of the video of the second region 408b is transmitted to the other user is optionally displayed on display 208 as well, overlaid on video received from that other user.

The first and second visible region 402a, 402b have a respective size and location determined by the video control module based on data received from resource manager 306 and data received from sensor processor 310 as explained below.

FIG. 5 shows a radiation pattern emitted by the projector 224. As shown in FIG. 5, the radiation pattern is systematically inhomogeneous, comprising a plurality of systematically disposed regions of alternating intensity. Specifically, the radiation pattern of FIG. 5 comprises a substantially uniform array of radiation dots. The radiation pattern is an infrared (IR) radiation pattern in this embodiment, and is further detectable by sensor 226. The radiation pattern of FIG. 5 is exemplary and use of other radiation patterns is envisaged.

This radiation pattern 500 is projected forward of the sensor 224 by the projector 226. The sensor 224 captures images of the non-visible radiation pattern as projected in its field of view. These images are processed by the sensor processor 310 in order to calculate depths of users in the field of view of the sensor 226 (effectively building a three-dimensional representation of the user) thereby allowing the recognition of different users and different respective body parts thereof.

FIG. 6B shows is a plan view of the user 102 in the vicinity of the user device 104, with FIG. 6A being a corresponding front view (as seen by camera 216 and sensor 226 of detector 222) and FIG. 6C being a corresponding side view. As shown, the user 102 is posing with their left hand is extended towards the detector 222 (although the user may of course pose in other ways). The users head protrudes beyond their torso, the torso being forward of their right arm. The radiation pattern 500 is projected onto the user by the projector 224.

As illustrated in FIG. 6A, the user 102 thus has a form which acts to distort the projected radiation pattern as detected by sensor 224 with parts of the radiation pattern projected onto parts of the user further away from the projector being effectively stretched (i.e. in this case, such that dots of the radiation pattern are more separated) relative to parts of the radiation projected onto parts of the user closer to the projector (i.e. in this case, such that dots of the radiation pattern are less separated), with the amount of stretch scaling with separation from the projector, and with parts of the radiation projected onto objects significantly backward of the user being effectively invisible to the sensor 226. Because the radiation pattern 500 is systematically inhomogeneous, the distortions thereof by the user's form can be used to discern that form (e.g. to identify the user's head, left hand, right arm, torso etc.) by the sensor processor 310 processing images of the distorted radiation pattern as captured by sensor 226. For instance, separation of an area of the user from the sensor could be determined by measuring a separation of the dots of the detected radiation pattern within that area of the user.

Whilst in FIGS. 5 and 6A the radiation pattern is shown as visible to a human eye, this is purely to aid in understanding and the radiation pattern as projected onto the user 102 will not be visible to a human eye in reality.

As will now be described with reference to FIGS. 7A and 7B, the images (sensor data) of the non-visible radiation pattern 500 captured by the sensor 226 are processed by the sensor processor 310. This processing comprises skeletal detection processing. Skeletal detection processing is known in the art and is currently implemented, for instance, in the Microsoft Xbox 360™ (sometimes used in conjunction with the Microsoft Kinect Sensor™) the results of which are made available by way of an Application Programming Interface (API) for use by software developers.

The sensor detector 310 receives sensor data from sensor 226 and processes it to determine a number of users (e.g. 102a, 102b) in the field of view of the sensor 226 and to identify a respective plurality of skeletal points for each user using skeletal detection techniques which are known in the art. Each skeletal point represents an approximate location of the corresponding human joint in the video.

Specifically, in this embodiment, sensor detector 310 detects twenty respective skeletal points for each user in the field of view of sensor 226. Each skeletal point corresponds to one of twenty recognized human joints, with each varying in space and time as a user (or users) moves within the sensor 226's field of view. The location of these joints at any moment in time is calculated based on the user's (or users' respective) three dimensional form as detected by sensor 226. A skeletal point also has a tracking state: it can be "tracked" for a clearly visible joint, "inferred" when a joint is not clearly visible but sensor processor 310 is inferring its location, or "non-tracked", for example, for a lower joint in seated-mode tracking (i.e. when it is detected that a user is seated and lower joints are not tracked by the sensor processor 310).

Each skeletal points may be provided with a respective confidence value indicate a likelihood of the corresponding joint having been correctly detects. Points with confidence values below a certain threshold may be excluded from processing by the video module 304.

Figure 7B:
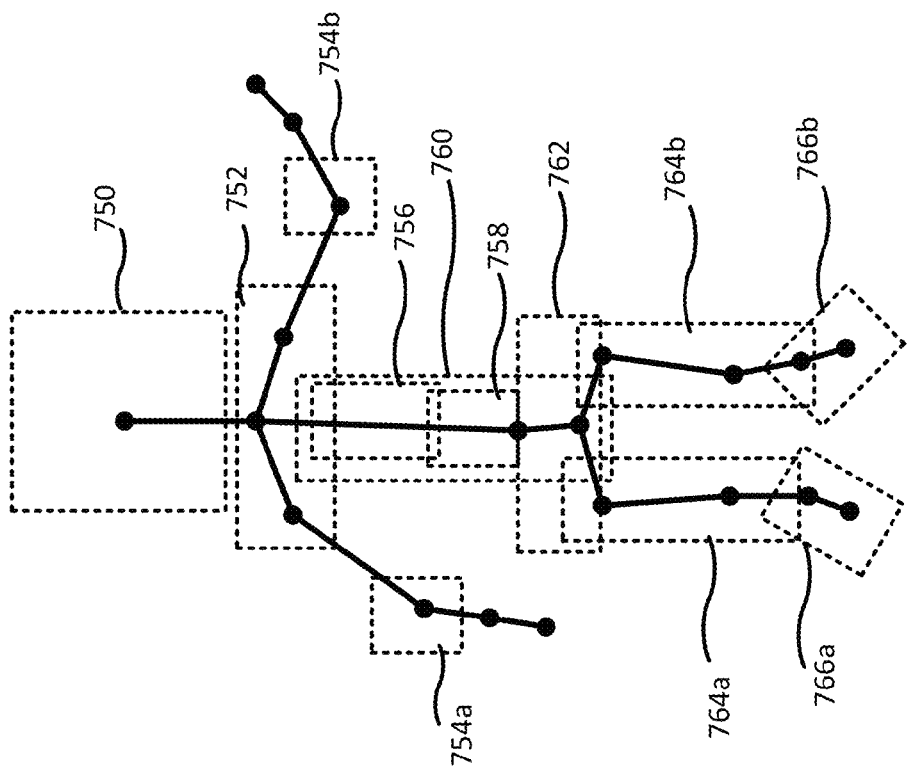
FIG. 7B is a schematic illustration of extrapolated user body parts.
Figure 7A:
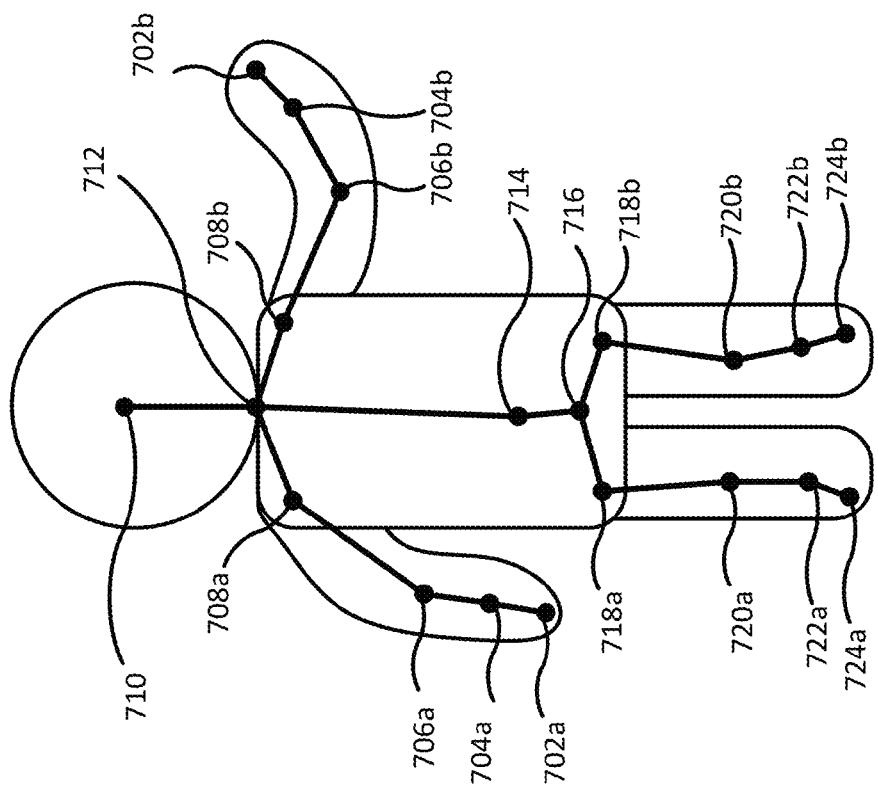
FIG. 7A is a schematic illustration of detected skeletal points of a user.

These twenty skeletal points are illustrated in FIG. 7A with the corresponding human joint shown in table 1.

TABLE 1

Skeletal Points

| Name of Skeletal Point: | Corresponding human joint: | Labelled as: |
|---|---|---|
| AnkleLeft | Left ankle | 722b |
| AnkleRight | Right ankle | 722a |
| ElbowLeft | Left elbow | 706b |
| ElbowRight | Right elbow | 706a |
| FootLeft | Left foot | 724b |
| FootRight | Right foot | 724a |
| HandLeft | Left hand | 702b |
| HandRight | Right hand | 702a |
| Head | Head | 710 |
| HipCenter | Centre, between hips | 716 |
| HipLeft | Left hip | 718b |
| HipRight | Right hip | 718a |
| KneeLeft | Left knee | 720b |
| KneeRight | Right knee. | 720a |
| ShoulderCenter | Centre, between shoulders | 712 |
| ShoulderLeft | Left shoulder | 708b |
| ShoulderRight | Right shoulder | 708a |
| Spine | Spine | 714 |
| WristLeft | Left wrist | 704b |
| WristRight | Right wrist | 704a |

The skeletal points and the video from camera 216 are correlated such that the location of a skeletal point as reported by the sensor processor at a particular time corresponds to the location of the corresponding human joint within a frame (image) of the video at that time. The sensor detector 310 supplies these detected skeletal points as skeletal point data to the video controller 304 for use thereby. For each frame of video data, the skeletal point data supplied by the sensor processor 310 comprises locations of skeletal points within that frame e.g. expressed as Cartesian coordinates (x,y) of a coordinate system bounded with respect to a video frame size.

The video controller 304 receives the detected skeletal points for one or more users (102a, 102b) and is configured to determine therefrom a plurality of visual characteristics of that user (or a respective plurality of visual characteristic of those users). In this embodiment, visual user characteristics take the form of human body parts. Body parts are detected by the video controller, each being detected by way of extrapolation from one or more skeletal points provided by the video processor 310 and corresponding to a region within the corresponding video frame of video from camera 216 (that is, defined as a region within the afore-mentioned coordinate system). FIG. 7B illustrates detected body parts which have been detected based on the skeletal points of FIG. 7A.

TABLE 2

Body Parts (Visual Characteristics)

| Name of Body part (visual characteristic) | That characteristic as detected in FIG. 7B: |
|---|---|
| Head | 750 |
| Shoulders | 752 |
| Mid-spine (upper portion of a spine) | 756 |
| Low-pine (lower portion of the spine) | 758 |
| Whole-spine (the entirety of the spine) | 760 |
| Hips | 762 |
| Elbows | 754a, 754b |
| Legs | 764a, 764b |
| Feet | 766a, 766b |

It should be noted that these visual characteristic are visual in the sense that they represent features of a user's body which can in reality be seen and discerned; however, in this embodiment, they are not "seen" by the video controller (e.g. they are not detected in video data captured by camera 216); rather the video controller extrapolates an (approximate) relative location, shape and size of these features within a frame of the video from camera 216 from the arrangement of the twenty skeletal points as provided by sensor processor 310 (and not based on e.g. processing of that frame)—for example, by approximating each body part as a rectangle (or similar) having a location and size (and optionally orientation) calculated from detected arrangements of skeletal points germane to that body part.

Figure 8:
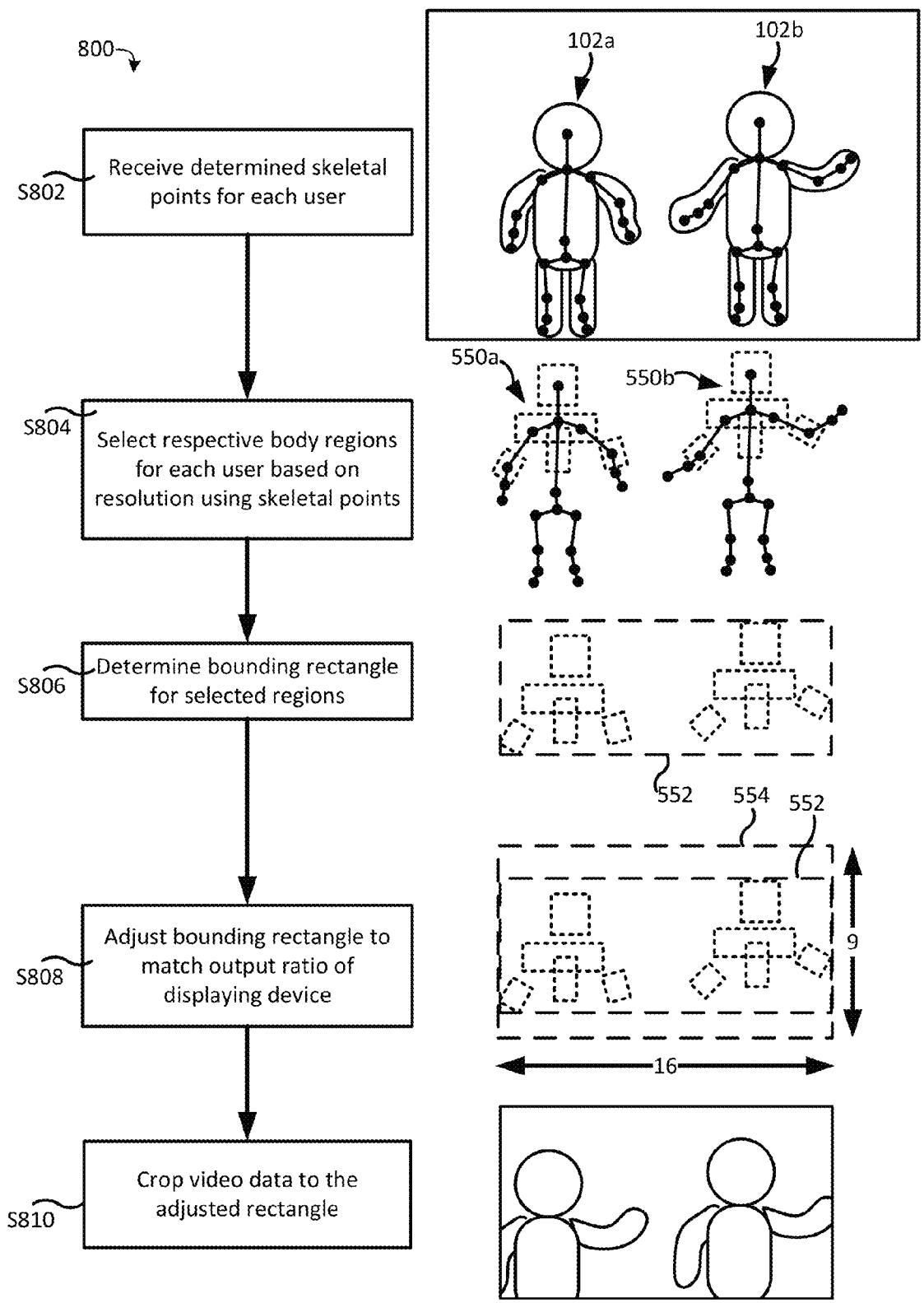
FIG. 8 is a flow chart of a method of controlling a video.

A method 800 of controlling video to be transmitted over a network based on detected user characteristics (body parts in this embodiment) will now be described with reference to FIG. 8. FIG. 8 shows a flowchart of the method 800 on the left and a corresponding visual representation of each method step on the right.

In this embodiment, the method is implemented algorithmically as part of the software of client 106—specifically by controller 302.

The method 800 will be described in the context of a real-time video call conducted using the first user (near-end) device 104 and the second user (far-end) device 110 between users thereof.

The method considers the following body regions:
Region 1: Head, Shoulders
Region 2: Head, Shoulders, MidSpine, Elbows
Region 3: Head, Shoulders, MidSpine, Elbows, LowSpine, Hips
Region 4: Head, Shoulders, WholeSpine, Elbows, Hips, Legs, Feet At the start of the video call the resource manager 306 of client 106 of the near-end device 104 determines a video resolution (to be used for video transmitted to the far-end device 110) based the information received thereby. For instance, this information may include information about one or more of:
  network resources such as channel bandwidth of a communication channel between the neared and far-end devices (by which channel the video is transmitted from the neared device to the far-end device);
  resources of the far-end device 110 as received from the far-end device e.g. screen size whereby a screen with more pixels has more screen resources than a screen with fewer pixels; an aspect ratio (e.g. 4:3, 16:9 etc.) of a screen of the far-end device being a ratio of a horizontal length of the screen to a vertical length of the screen; a processing resources of one or more processors of the far-end device (e.g. available processor cycles in megahertz, gigahertz etc.); memory resources of the far-end device (e.g. available memory in megabytes, gigabytes etc.); video decoding capabilities
resources of the near-end device e.g. processing resources of one or more processors of the near-end device (e.g. available processor cycles in megahertz, gigahertz etc.); memory resources of the far end near-end device (e.g. available memory in megabytes, gigabytes etc.); video encoding capabilities.

The video resolution may be determined, at least in part, by way of negotiation with the far-end device 110 (e.g. whereby the near-end resource manager 306 request information about resources of the far-end device therefrom).

During the call, the resource manager 306 of the near-end device 104 monitors available resources (e.g. the available bandwidth), takes decisions to increase or decrease the resolution for the video being sent to the far-end device 108, and communicated those decisions to the video controller 304. The video resolution may thus vary dynamically thought the call e.g. due to fluctuation channel bandwidth arising, say, from one or both of the neared and far-end devices being connected to the network 106 via an unreliable wireless e.g. WiFi connection).

Selection of characterises comprises selecting more characteristics if the received information indicates better channel quality and/or more device resources and selecting fewer characteristics if the received information indicates worse channel quality and/or more fewer device resources. For instance, for lower bandwidth and/or smaller screen size a lower resolution is determined by the resource manager 306 (causing selection a region with fewer body parts); for higher bandwidth and/or larger screen size, a higher resolution is determined by the resource manager 306 (causing selection a region with more body parts) than is determined for said lower bandwidth and/or said smaller screen size.

In this embodiment, video is captured from camera 216 at a fixed resolution of 1920×1080 pixels. However, as described below, the captured video may be cropped (cropping being to the removal of the outer parts of images of the video) prior to transmission. That is, only selective parts of the captured videos data—as captured from a selected visible region—are supplied to encoder 308 for encoding and subsequent transmission to the far-end device. Supplying cropped video data thus means supplying less video data to the encoder 308 as video data outside of the defined region is not supplied to the encoder.

The skeletal point data is received by the video controller from the sensor processor 310 at step S802. In the exemplary illustration on the right-hand side of FIG. 8, skeletal data for collocated users 102a and 102b (both in the field of vision of sensor 226) is shown. However, the method 800 can be applied to received skeletal data for any number of users (one or more) as will be apparent.

At step S804, the video controller 304 selects respective body regions for each user in the field of view of sensor 216 based on the determined resolution received from the resource manager 306. Depending on this video resolution, the video controller selects body regions out of the possible plurality of body regions of table 2 as follows:

| | |
|---|---|
| Resolution 1920 × 1080: | Region 4 |
| Resolution equal or greater than 1280 × 1024: | Region 3 |
| Resolution equal or greater than 640 × 480: | Region 2 |
| Other resolutions: | Region 1 |

Or alternatively as follows:

| | |
|---|---|
| Resolution width 1920: | Region 4 |
| Resolution width equal or greater than 1280: | Region 3 |
| Resolution width equal or greater than 640: | Region 2 |
| Other resolutions: | Region 1 |

The selection of characterises comprises selecting more characteristics for higher resolutions (better channel conditions and/or greater device resources) and selecting fewer characteristics for lower resolutions (worse channel conditions and/or lesser device resources).

For each user 102a, 102b in the field of vision of sensor 226, the selected region is detected (that is, respective body parts of the selected region are detected) based on the received skeletal data. The video is then cropped (as described below), before being encoded and transmitted, based on the detected body parts (e.g. for region 1, the video is cropped based on detection of user 102a's head, user 102b's head, user 102a's shoulders, and user 102b's shoulders but not on any other body parts of those users as only the head and shoulders are included in region 1). Thus, not all skeletal points necessarily contribute to the cropping (as some of these may serve only to define body parts that are not part of the selected region). That is, the control of the video may be based on a selection of skeletal points of the plurality of detected skeletal points but not others of the plurality of detected skeletal points.

For instance, in the exemplary depiction on the right hand side of FIG. 8, region 2 (head, shoulders, mid-spine, elbows) has been selected, and video control is thus based on detected region 2 characteristic for both user 102a (550a in FIG. 8) and for user 102b (550b in FIG. 8).

As part of the video control (which comprises selectively cropping the video in accordance with the determined resolution in this embodiment), at step S806 the video controller generates boundary data based detection of the body parts of the selected region. The boundary data defines a rectangular boundary 552 (cropping rectangle). The cropping rectangle is formed from the union of the respective detected regions for all tracked users.

At step S808, video controller 304 modifies the generated boundary data based on a predetermined aspect ratio (e.g. an aspect ratio of a display of the far-end device 110, such as 4:3, 16:9 etc.), whereby the cropping rectangle is adjusted to the predetermined aspect ratio. The adjusted cropping rectangle (bounding rectangle) is shown as 554 on the right hand side of FIG. 8 (and has an aspect ratio of 16:9 in this embodiment).

At step S810, the video is cropped based on the adjusted rectangle as explained in more detail below. The cropped video is then scaled to an output resolution (e.g. matching that of the screen of the fared device to which it is being transmitted), before being encoded by encoder 308.

The method 800 is performed for each frame of the video data. Because the boundary rectangles track users characteristics—which may move as a user moves about, or separate as e.g. two users move apart—between frames, cropping rectangles move around.

However, rather than simply cropping each frame of video data to the adjusted rectangle determined for that frame (i.e. by supplying only video data from the portion of that frame defined by the adjusted rectangle), transition data is generated based on respective adjusted rectangles calculated for one or more earlier frames and on the adjusted rectangle calculated for a current frame. The transition data is generated based on an elastic spring model.

In embodiments, the elastic spring model may be defined as follows:

$$m * \frac{d^2 x}{dt^2} = -k * x - D * \frac{dx}{dt}$$

Where m ("mass"), k ("stiffness") and D ("damping") are configurable constants, and x (displacement) and t (time) are variables. That is, a model whereby an acceleration of a transition is proportional to a weighted sum of a displacement and velocity of that transition.

The cropping rectangles move around according to the elastic spring model, which smoothes transitions between frames and prevents jittery video. It also increases efficiency of encoding for the following reason. Because the elastic model effectively 'dampens' movement of cropping rectangles, it reduces differences between adjacent frames which, as will be apparent, results in more efficient differential encoding.

Figure 9:
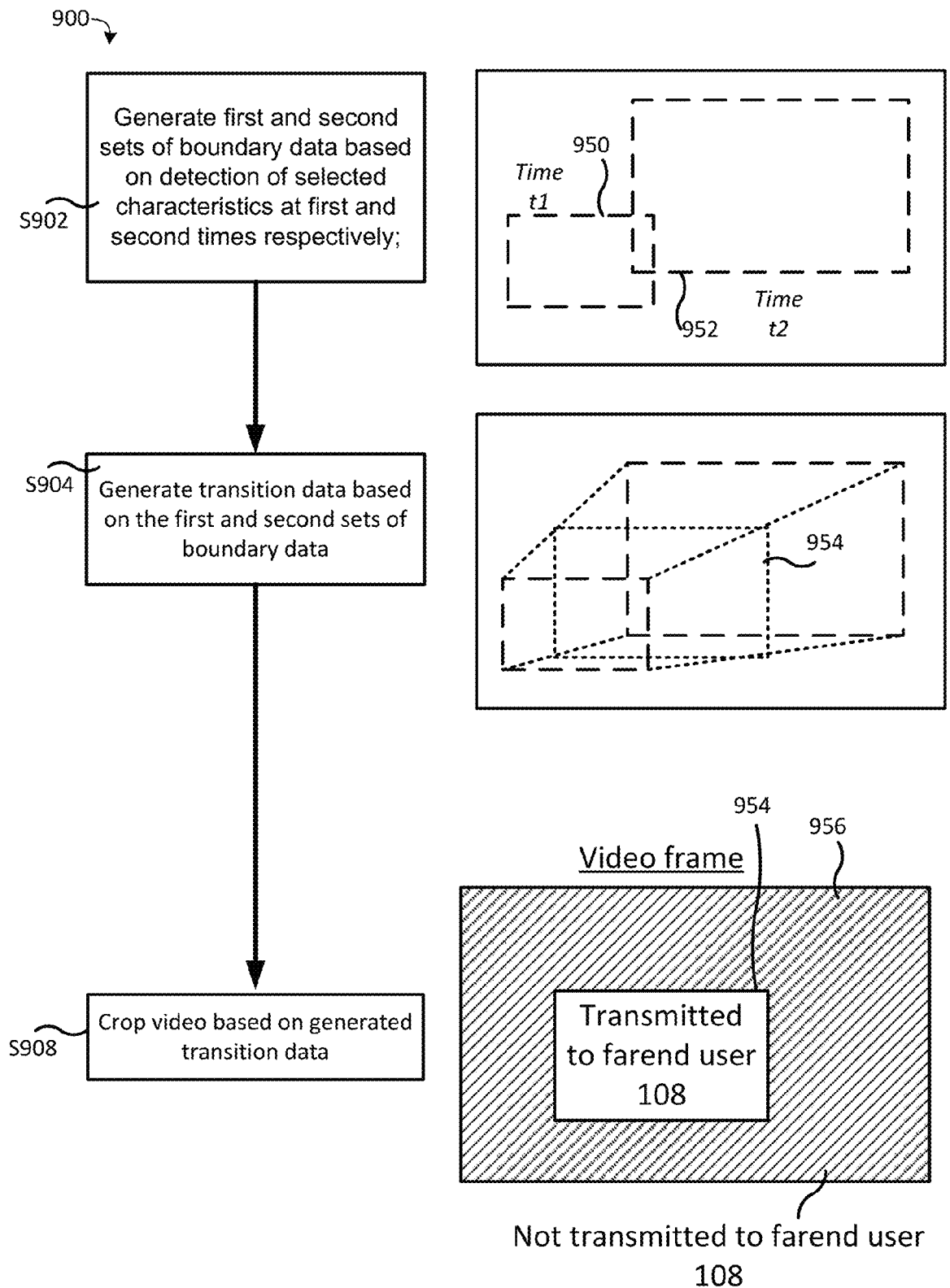
FIG. 9 is a flow chart of a method of controlling a video as time progresses.

This will now be described with reference to FIG. 9. FIG. 9 shows a flowchart of a method 900 of controlling video to be transmitted to the far-end user as time progresses and an exemplary pectoral representation of the method 900 on the right hand side.

At step S902, for a current video frame 956 in the sequence of video frames of the captured video, the video controller generate a first set and one or more second sets of boundary data (e.g. by calculating bounding rectangles having predetermined aspect ratios as described above) based on detection of the selected visual user characteristics (body parts in this embodiment) at a first time and one or more second times respectively, the first time being a time of the current frame 956 and the second time(s) being time(s) of previous frames. The boundary data for earlier frames may be generated before the boundary data for later frames (e.g. on a frame-by-frame basis). Therefore S902 may take place over a period spanning several video frames.

Two exemplary bounding rectangles 950, 952 at a respective first time t1 and second time t2 are shown on the right hand side of FIG. 9. The rectangle for t2 is shown larger than the rectangle for t1 which may be e.g. due to two users (102a, 102b) being tracked and those users moving further apart, or due to a change in available resources (e.g. increase in channel bandwidth) causing the resource manager 306 to increase the determined aspect ratio, resulting in a region with more body parts being selected (e.g. a switch from region 1 to region 2) and the bounding rectangle being automatically adjusted by the video controller 304 accordingly.

At step S904, the video module 304 generates transition data based on the first and second sets of boundary data using the dynamic model described above. The generated transition data effectively defines a transitional bounding rectangle 954 (shown in FIG. 9) representing a transition to the bounding rectangle of the current frame 956 from bounding rectangles of previous frames.

For example, in accordance with the above elastic spring model, bounding rectangles may be parameterized by one or more points at different locations (one form of boundary data). A point may have a second position ("desiredPosition") at time t2 being a parameter of rectangle 952 and a first position "currentPosition" at time t1 being a parameter of rectangle 950. In this case, the transition data may be generated by updating "currentPosition" as follows, with the updated "currentPosition" being a parameter of the transitional bounding rectangle 954:

```
velocity = 0
previousTime = 0
currentPosition = <some_constant_initial_value>
UpdatePosition (desiredPosition, time)
{
    x = currentPosition - desiredPosition;
    force = - stiffness * x - damping * m_velocity;
    acceleration = force / mass;
    dt = time - previousTime;
    velocity += acceleration * dt;
    currentPosition += velocity * dt;
    previousTime = time;
}
```

At step S908, the video controller control the video based on the transition data to track the selected characteristics. Here, this involves cropping the video such that only image data of frame 956 that is within bounding rectangle 954 is supplied to the encoder 308 for encoding and transmission to the far-end user 108 (and not image data of frame 956 that is outside of bounding rectangle 954).

The detector 222 and sensor processor 310 are configured such that users separated by more than approximately 1 meter from the detector 222 are not tracked (that is are outside of the field of vision of the sensor), so they don't affect the cropping rectangle. Thus, for instance, if two users are initially being tracked and one moves out of the field of vision, in accordance with the methods 800 and 900, cropping rectangles calculated thereafter will be based only on the remaining user's characteristics and will thus automatically 'zoom in' on the remaining user (with the elastic model ensuring a smooth transition for this zoom).

In embodiments, the video controller 304 may feed back into the resource manager 306, such that if the resource manager considers there is enough bandwidth for 1920×1080 video, but there is at least one body to be tracked the video send resolution is switched to 1280×720 to enable dynamic tracking (as, for video transmitted resolution equal to that at which it is captured, there is no 'room for manoeuvre' as, for each frame, the cropping rectangle effectively encompasses the entirety of that frame—this is true e.g. where up-scaling is not employed).

As indicated, the sensor processor 310 supplies not only information identifying each detected skeletal point but also identifying which of one or more users in the sensor 226's field of vision those skeletal points corresponds to. Thus, the described method 800 can be implemented with any number of users (as long as the sensor detector 226 remains capable of distinguishing there between) and, for each characteristic in the selected region, will track those characterises for each region. Thus, the method 800 adapts automatically as multiple users walk in and out of frame, with the bounding rectangles automatically transitioning in a smooth manner (due to the elastic model) to accommodate new users as they walk into frame (by effectively zooming out to include any body parts of that user for the selected region in the video) and to adjust as users walk out of frame (by effectively zooming in to exclude any regions previously occupied by body parts of that user for the selected region such that only body parts for the selected region of the remaining users are retained in the video).

The methods 800, 900 implemented by the controller 302 can be implemented during a multiparty call conducted over the network 106 using e.g. user devices 104, 110 and 114 (between users 102a, 102b, 108 and 112), with individual bounding rectangles being determined by the near-end user 104 (first device) for each far-end device 110 (second device) and 114 (third device).

That is, in addition to the above, the resource manager may receive further information about at least one of: a communication channel between the user device 104 and the third user device 114, and resources of the further user device (in addition to receiving the information described above such as similar information for the second device 110). The resource manager then selects further characteristics selected from the plurality of visual user characteristics (e.g. body parts) based on the received further information for controlling video to be transmitted to the third user device 114 (in addition to selecting the aforementioned characteristics for controlling video to be transmitted to the second user device 110).

The video controller 304 then controls the video to be transmitted to the third user 114 device based on detection of the selected further characteristics selected for the third device 114 (in order to track the selected further characteristics in the third device video), whilst controlling the video to be transmitted to the second user device 110 based on detection of the characteristics selected for the second device 110.

The further selection of characteristics for the third user device may be independent and different from the selection of characterises for the second user device. Thus the further video transmitted to the second user device may be different form the video transmitted to the second user device, with the further video transmitted to the third user device tracking more or fewer user characteristics than the video transmitted to the second user device.

The selection of the characteristics for the second user device video is independent from the selection of characteristic for the third user video. Whilst a condition (such as the first user device 104 being connected to the network 106 via a slow connection) may cause a similar cropping for both, other conditions (such as one of the second and third devices being connected to the network 106 via a slow connection, or one of those devices having limited resources) may cause different cropping.

For example, the third user device 114 may have a small screen (e.g. smartphone screen) and/or be connected to the network 106 via a slow connection; in contrast, the second user device 110 may have a large screen (e.g. be connected to a TV screen) and/or be connected to the network 106 via a fast connection. In this case, video transmitted to the second user device may be subject to "region 4" cropping (see table 2) such that user 108 receives video showing users 102a and 102b top-to-toe. In contrast, video transmitted to user device 114 may be subject to "region 1" cropping (see table 2) such that user 112 receives video showing only the respective heads and shoulders of users 102a, 102b.

Whilst in the above, the video to be transmitted over the network is controlled by way of video signal processing, alternatively or additionally the video may be controlled by the video controller 304 (of controller 302) by manipulating the camera itself based detection of the selected features e.g. the manipulation comprising manipulating mechanics of the camera to perform at least one of: a pan operation, a zoom operation and a tilt operation. For e.g. a multi-party call, optical zoom and digital zoom (cropping) may be used in conjunction e.g. with mechanical zoom being used to capture video showing the highest selected number of user characteristics (e.g. mechanical zoom could be used to select a region to be shown to the second user device 110 in the above example) with cropping of that video being used to control video for users who are to be sent video with fewer user characteristics (e.g. the third device 114 in the above example).

Further, whilst in the above an elastic model is employed, as an alternative any dynamic model (e.g. based on one or more differential equations in time) could be used to generate the transition data.

Further, whilst in the above selected visual characteristic (legs, arms etc.) are detected based on sensor data supplied by a depth detector which projects a nonvisible radiation pattern forward of a sensor configured to detect that pattern, alternative detections are envisages. For instance, a depth detection could be a time-of-flight based detection in which radiation propagation times are used to measure depth. Alternatively, an array of cameras having different inclinations (such as a plenoptic camera used in conjunction with a 3D image recognition algorithm) or similar) could be used to build up a 3D image (from multiple two-dimensional images), with the visual characteristic being detected form the 3D image.

Generally, any of the functions described herein (e.g. the functional modules shown in FIG. 3 and the functional steps shown in FIGS. 8 and 9) can be implemented using software, firmware, hardware (e.g., fixed logic circuitry), or a combination of these implementations. The modules (video processing system 300, controller 302, video signal processor 304, resource manager 306, encoder 308 etc.) shown separately in FIG. 3 and the steps shown separately in FIGS. 8 and 9 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. For example, some or all of the modules of FIG. 3 may be implemented by software of a client application executed on one or more processors. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device comprising:
    a network interface configured to transmit video of one or more users, received from an image capture device, to at least another user device via a network;
    a video controller configured to select of one or more characteristics from a plurality of visual user characteristics and control the video based on detection of the selected characteristics to track the selected characteristics, the detection of the selected characteristics comprising receiving, for at least one of the users, a plurality of detected skeletal points of that user, the video being controlled based on the detected skeletal points; and
    a resource manager configured to receive information about a communication channel between the user device and the other user device and/or about one or more resources of the user device and/or the other user device and, based on the received information, to control said selection by the video controller.

2. A user device according to claim 1, wherein the plurality of visual characteristics is a plurality of user body parts.

3. A user device according to claim 2, wherein the plurality of body parts comprises: head and/or shoulders and/or mid-spine and/or low-spine and/or whole-spine and/or elbows and/or hips and/or legs and/or feet.

4. A user device according to claim 3, wherein the selection of the characteristics is a selection of one body region out of four body regions, a first of said four body regions comprising the head and the shoulders; a second of said four body regions comprising the head, the shoulders, the mid-spine and the elbows; a third of said four body regions comprising the head, the mid-spine, the elbows, the low-spine and the hips; a fourth of said four body regions comprising the head, the shoulders, the whole-spine, the elbows, the hips, the legs and the feet.

5. A user device according to claim 1, wherein the video is of a plurality of users, the video controller being further configured to control the video based on detection of the selected characteristics for each of the users to track the selected characteristics for each of the users.

6. A user device according to claim 1, wherein the resource manager is further configured to determine a video resolution based on the received information, the selection of the characteristics by the video controller being based on the determined video resolution.

7. A user device according to claim 6, wherein the selection of characteristics comprises selecting more characteristics if the received information indicates better channel quality and/or more device resources, and selecting fewer characteristics if the received information indicates worse channel quality and/or more fewer device resources.

8. A user device according to claim 1, wherein the network interface is further configured to transmit further video of the one or more users, received from the image capture device, to a further user device via set network;
    wherein the video controller is further configured to perform a further selection of one or more characteristics from the plurality of visual user characteristics and control the further video based on detection of the selected further characteristics to track the selected further characteristics; and
    wherein resource manager is further configured to receive further information about a communication channel between the user device and the further user device and/or one or more resources of the further user device and, based the received further information, to control said selection by the video controller.

9. A user device according to claim 1, wherein said control of the video is based on a selection of skeletal points of the plurality of detected skeletal points but not others of the plurality of detected skeletal points.

10. A user device according to claim 9, wherein generating the boundary data comprises generating respective individual boundary data for each of the selected characteristics, the boundary data being based on the individual boundary data for each selected characteristic.

11. A user device according to claim 9, wherein boundary data defines a boundary having an aspect ratio received from the other user device.

12. A user device according to claim 1, wherein said control comprises generating boundary data based on the detection of the selected characteristics.

13. A user device according to claim 12, wherein said control comprises at least one of: processing video data received from the image capture device based on the generated boundary data, and manipulating mechanics of the image capture device based on the generated boundary data.

14. A user device according to claim 13, wherein said processing of the video data comprises cropping the video data based on the generated boundary data, said transmission being transmission of the cropped video data.

15. A user device according to claim 14 further comprising an encoder configured to encode video data, the video controller being further configured to supply the cropped video data to the encoder and the encoder being further configured to supply the encoded video data to the network interface for said transmission.

16. A user device according to claim 1, further comprising a depth detection device, the detection of the selected characteristics by the video controller being based on sensor data supplied to the controller by the depth detection device.

17. A system comprising:
    an image capture device;
    one or more processors, coupled to the image capture device; and
    one or more memory devices comprising instructions, executable by the one or more processors, to configure the system to perform a method comprising:
        transmitting video of one or more users, received from the image capture device, to at least another user device via a network;
        receiving information about a communication channel between the user device and the other user device and/or about one or more resources of the user device and/or the other user device;
        selecting characteristics from a plurality of visual user characteristics based on the received information; and
        controlling the video based on detection of the selected characteristics to track the selected characteristics, the detection of the selected characteristics comprising receiving, for at least one of the users, a plurality of detected skeletal points of that user, the video being controlled based on the detected skeletal points.

18. A user device comprising:
    a network interface for connecting to a network;
    one or more processors configured to:

transmit video of one or more users, received from an image capture device, to another user device via the network;

select characteristics from a plurality of visual user characteristics;

generate first and second sets of boundary data based on detection of the selected characteristics at first and second times respectively;

generate transition data based on the first and second sets of boundary data using a dynamic model; and control the video based on the transition data to track the selected characteristics.

19. A user device according to claim 18, wherein the dynamic model comprises an elastic spring model.

20. A user device according to claim 18, wherein said control comprises generating boundary data based on the detection of the selected characteristics.

21. A method of transmitting video of one or more users, from a user device to another user device, the method comprising:

receiving the video from an image capture device;

receiving information about a communication channel between the user device and the other user device and/or about one or more resources of the user device and/or the other user device;

based on the received information, detecting one or more selected characteristics from a plurality of visual user characteristics in the received video;

controlling the video, based on said detecting the selected characteristics, to track the selected characteristics, said detecting of the selected characteristics comprising receiving, for at least one of the users, a plurality of detected skeletal points of that user, the video being controlled based on the detected skeletal points; and transmitting the video to the other user device via the communication channel.

22. The method of claim 21, wherein the plurality of visual user characteristics is a plurality of user body parts, and wherein the plurality of body parts comprises: head and/or shoulders and/or mid-spine and/or low-spine and/or whole-spine and/or elbows and/or hips and/or legs and/or feet.

23. The method of claim 22, wherein the selection of the characteristics is a selection of one body region out of four body regions, a first of said four body regions comprising the head and the shoulders; a second of said four body regions comprising the head, the shoulders, the mid-spine and the elbows; a third of said four body regions comprising the head, the mid-spine, the elbows, the low-spine and the hips; a fourth of said four body regions comprising the head, the shoulders, the whole-spine, the elbows, the hips, the legs and the feet.

24. The method of claim 21, wherein the video is of a plurality of users, and wherein said controlling the video is based on detecting the selected characteristics for each of the users to track the selected characteristics for each of the users.

25. The method of claim 21, the method further comprising determining a video resolution based on the received information, the selection of the characteristics being based on the determined video resolution.

26. The method of claim 25, wherein the selection of characteristics comprises selecting more characteristics if the received information indicates better channel quality and/or more device resources, and selecting fewer characteristics if the received information indicates worse channel quality and/or fewer device resources.

27. A method of transmitting video of one or more users, from a user device to another user device over a network, the method comprising:

receiving the video from an image capture device;

selecting characteristics from a plurality of visual user characteristics;

generating first and second sets of boundary data based on detecting the selected characteristics at first and second times respectively;

generating transition data based on the first and second sets of boundary data using a dynamic model;

controlling the video based on the transition data to track the selected characteristics; and transmitting the video to the other user device via the network.

28. The method of claim 27, wherein the dynamic model comprises an elastic spring model.

* * * * *